United States Patent Office 3,702,794
Patented Nov. 14, 1972

3,702,794
METHOD OF IMPROVING THE ADHESION OF A SILICEOUS MATERIAL AND A POLYOLEFIN USING A SILANE AND A CHLORINATED ORGANIC COMPOUND
Robert C. Hartlein, Midland, Mich., assignor to Dow Corning Corporation, Midland, Mich.
No Drawing. Application Aug. 5, 1970, Ser. No. 61,505, now Patent No. 3,630,827, which is a continuation-in-part of abandoned application Ser. No. 788,907, Jan. 3, 1969. Divided and this application Apr. 30, 1971, Ser. No. 139,135
Int. Cl. B32b 7/60, 17/06; C03c 17/30
U.S. Cl. 156—310
16 Claims

ABSTRACT OF THE DISCLOSURE

Polyolefin resins, such as polypropylene, are strengthened by the incorporation of a siliceous reinforcing material which has a first coating (a) of a silane coupling agent, such as $(C_2H_5O)_3SiCH_2CH_2CH_2NHCH_2CH_2NH_2$ and a second coating (b) of a chlorinated organic compound, such as perchlorinated para-xylene.

---

This application is a division of copending application Ser. No. 61,505, filed Aug. 5, 1970, and now U.S. Pat. No. 3,630,827, which in turn is a continuation-in-part of application Ser. No. 788,907, filed Jan. 3, 1969, and now abandoned.

This invention relates to solid siliceous materials which have been treated to increase their adhesion to polyolefin resin. In one aspect, the invention relates to a composite of siliceous-reinforced polypropylene which exhibits improved strength. In another aspect, the invention relates to a method of improving the adhesion of glass fibers to polypropylene and polyethylene resins.

Reinforcing materials, such as asbestos, glass fibers silica in the form of sand, and the like have been used to improve the rigidity, dimensional stability and high temperature properties of articles formed from polypropylene and polypropylene resins. The effectiveness of siliceous materials in reinforcing the polymers is a function of the degree to which the polymer adheres to the solid siliceous material. One proposed method of increasing the bond strength at the polymer-reinforcing material interface is to combine a peroxide with an unsaturated silane in order to promote free radical polymerization of the silane coupling agent and the polymer. This method is not commercially attractive because of the limited stability of the peroxide cross-linking agent.

By the practice of the invention, wherein polyolefin resins are reinforced with siliceous materials which have been treated with a certain silane coupling agent and chlorinated organic compounds, a reinforced plastic of greatly increased strength is obtained. The reinforced resins have a variety of applications, for example, they are molded to form auto bodies and boat hulls.

It is an object of the invention to provide coated siliceous materials which exhibits improved adhesion to polypropylene and polyethylene resins.

Another object of the invention is to provide reinforced polyolefin articles of increased strength.

Another object of the invention is to provide a method of improving the bonding of polyolefin resins to a siliceous substrate.

These and other objects of the invention will be apparent to one skilled in the art upon consideration of the following disclosure and appended claims.

According to the invention, there is provided a solid siliceous material having coated on the surface thereof a first coating.

(1) Of a silane of the general formula $X_aR_{3-a}SiR'$ and partial condensates thereof: in which X is the hydroxyl group or a hydrolyzable radical;
$a$ has a value of 2 or 3;
R is a lower alkyl radical; and
R' is an organofunctional radical selected from the group consisting of amino radicals, mercapto radicals, aryl, alkaryl and aralkyl radicals of no more than 14 carbon atoms, monovalent linear aliphatic hydrocarbon radicals containing a tertiary hydrogen atom and having no more than 18 carbon atoms, monovalent hydrocarbon radicals of no more than 18 carbon atoms which contain a vinyl linkage; and a second coating, (2) Of a chlorinated organic compound selected from the group consisting of octachlorocyclopentene, chlorinated and perchlorinated xylenes, perchlorinated 4,4'-dimethyl-biphenyl, chlorendic acid, chlorendic anhydride, octachloropropane, hexachloroethane, trichloromelamine and chlorinated paraffinic hydrocarbons having from 10 to 30 carbon atoms and containing from 40 to 75 percent by weight chlorine.

The term siliceous material includes glass fibers and cloth, asbestos, mica, silica in the form of sand, glass panels and the like. Of particular importance to reinforced plastics are glass fibers in the form of rovings, yarn, chopped fibers, strands and bundles.

The silane used in the first coating (1) of the solid siliceous material is a coupling agent in which the X substituent is a hydroxyl group or a hydrolyzable radical. As used herein, "hydrolyzable radical," is defined as a silicon-bonded radical which is replaced by water at substantially room temperature to form a silanol radical, i.e., Si—OH. Such radicals are well known in the art, representative examples being alkoxy groups, such as methoxy, ethoxy, allyloxy, β-methoxyethoxy and isopropoxy; acyloxy groups, such as acetate, propinate and butyrate; halogen atoms, such as chlorine, bromine and iodine; ketoxime groups, such as

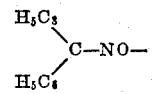

and $(CH_3)_2C=NO—$; and the isocyanate group. Because of their commercial availability the trialkoxy silane coupling agents are preferred.

R is a lower alkyl radical; such as methyl, ethyl, butyl and hexyl radicals.

In the silane coupling agent, the organofunctional radical (R') is selected from the above described group. Suitable amine functional radicals include radicals containing primary or secondary amine groups or both, for example, $H_2N(CH_2)_3—$,

$H_2NCH_2—$, $H_2N(CH_2)_2NH(CH_2)_3—$
$CH_2HN(CH_2)_2NH(CH_2)_3$, and $CH_3HN(CH_2)_3—$ Mercapto radicals include $HS(CH_2)_3—$, $HSCH_2—$ and

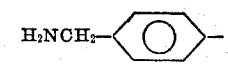

The mercaptosilanes are defined generally as $HSR''Si\equiv$ where R'' is a divalent hydrocarbon radical free of aliphatic unsaturation.

Exemplary of aryl, alkaryl and aralkyl radicals are the following: phenyl, tolyl, xylyl, biphenyl, 2-phenylpropyl, benzyl,

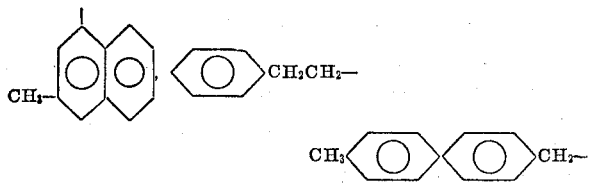

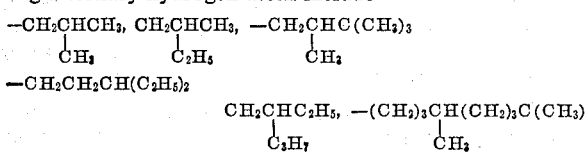

and the like. Halogen substitution of these groups is not within the scope of the invention.

The monovalent aliphatic hydrocarbon radicals having a tertiary hydrogen atom include $-CH_2CHCH_3$, $CH_2CHCH_3$, $-CH_2CHC(CH_3)_3$
  $|$           $|$           $|$
  $CH_3$        $C_2H_5$      $CH_3$ $-CH_2CH_2CH(C_2H_5)_2$ $CH_2CHC_2H_5$, $-(CH_2)_3CH(CH_2)_3C(CH_3)$
  $|$              $|$
  $C_3H_7$         $CH_3$ and the like. The vinyl containing radicals include $-CH=CH_2$
$-(CH_2)_2CH=CH_2$, $-(CH_2)_4CH=CHCH_3$ $-(CH_2)_3CH=C(CH_2)_2CH_3$
            $|$
            $CH_3$ $-CH=CHCH_3-CH_2-(CH_2)_{13}CH=CH_2$, $-CH_2-(CH_2)_{15}-CH=CH_2$, $-(CH_2)_4CH=CHCH_2CC(CH_3)_3$ $-(CH_2)_3CH=CH(CH_2)_2CH$ and like radicals containing no more than 18 carbon atoms.

The chlorinated organic radicals which are operable in the practice of the invention include octachlorocyclopentene, represented structurally as

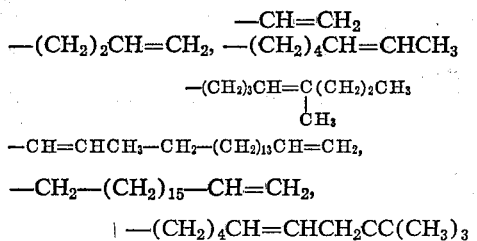

chlorinated xylenes in which the methyl substituents are chlorinated, such as

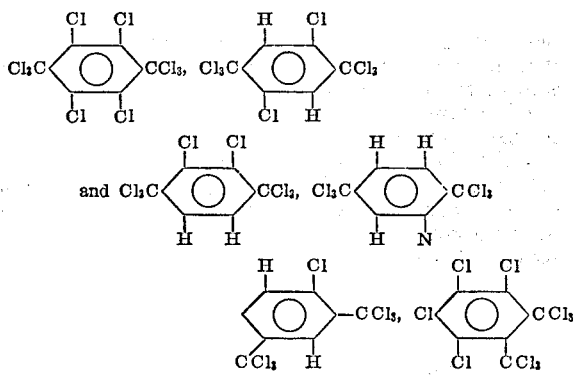

perchloro--4,4'-dimethyl-biphenyl, chlorendic acid and its anhydride, the anhydride having the formula

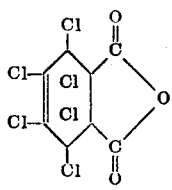

octachloropropane, hexachloroethane and trichloromelamine

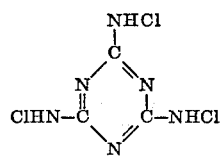

The chlorinated paraffins utilized in the practice of the invention can be represented by the formula $$C_nH_{(2n+2)-m}Cl_m$$

wherein $n$ is an integer having a value of from 10 to 30 inclusive and $m$ is an integer having a value sufficient to provide from 40 to 75 weight percent chlorine in the hydrocarbon. Mixtures of the chlorinated paraffins can be used.

The above group of chlorinated organic compounds is believed to be critical in the practice of the invention. It has been found that closely related chlorinated compounds, such as hexachlorocyclopentadiene and tetrachlorophthalic anhydride, are inactive and give no increase in strength when used in combination with the silanes.

Further is accordance with the invention, there is provided a method of improving the adhesion of (a) solid siliceous materials to (b) polymers and copolymers of propylene and ethylene comprising the steps of:

(1) Applying to the surface of (a) a silane (c) of the general formula $X_aR_{3-a}SiR'$ and partial condensates thereof, in which:

X is the hydroxyl group or a hydrolyzable radical;
R is a lower alkyl radical;
R' is an organofunctional radical selected from the group consisting of amino radicals, mercapto radicals, aryl, alkaryl and aralkyl radicals of no more than 14 carbon atoms, monovalent linear aliphatic hydrocarbon radicals containing a tertiary hydrogen atom and having no more than 18 carbon atoms and monovalent hydrocarbon radicals containing a vinyl linkage and having no more than 18 carbon atoms;
$a$ has a value of 2 or 3;

(2) Applying to the surface of at least one of the silane treated (a) or (b), a chlorinated organic compound (d) selected from the group consisting of octachlorocyclopentene, chlorinated xylene, perchlorinated xylene, perchloro-4,4-dimethyl-biphenyl, chlorendic acid, chlorendic anhydride, octachloropropane, hexachloroethane, trichloromelamine and chlorinated paraffinic hydrocarbons having from 10 to 30 carbon atoms and containing from 40 to 75 percent by weight chlorine.

(3) Contacting (a) and (b) with the treated surface or surfaces between them; and (4) Applying energy to the composite of (a), (c), (d) and (b) until a bond is formed between them which is superior in strength to the bond formed by (a) and (b) alone.

The silane coating can be applied by conventional techniques, for example, from an aqueous solution usually containing 0.1 to 5 weight percent of silane. The material can be applied by dipping, brushing or spraying. Glass fibers and cloth can be immersed in a bath of the aqueous solution and the excess solution can be removed by passing the treated material through the nip of a pair of padded rollers. The amount of silane (c) coated onto the siliceous material is in the range of 0.1 to 2.5 weight percent. Amounts as small as 0.05 percent are sometimes effective while amounts from 5 percent do not enhance the reinforcing effect and therefore are uneconomical. It is not necessary to dry or cure the silane before applying the coating of chlorinated organic compound (d). The chlorinated organic compound can be applied from a suitable solvent such as toluene or acetone, by utilizing the above described techniques. The amount of chlorinated material to be applied to the siliceous reinforcing material varies with the particular organic compound but is generally in the range of 0.2 to 5 percent based on the weight of the siliceous material.

If desired, the silane and chlorinated material can be dissolved in a mutual solvent and be applied from a single bath. This is especially advantageous when a glass fiber producer treats the surfaces of his product and the end user merely blends the glass and resin.

Several methods of bonding the treated siliceous reinforcing material and the resins can be utilized. Some involve contacting the reinforced material with the molten polyolefin resin and allowing the composite to cool below the softening point of the resin. Laminates of treated glass cloth and polymer film can be heated and pressed to form a high strength composite. The coated glass fibers can also be chopped and blended with resin pellets or powder to form a molding compound which is mixed in a reciprocating screw and injection molded to form superior resin composites. High energy radiation in the form of ultraviolet light or gamma radiation can also be applied to the composite to form the bond. In any case the energy applied must be sufficient to activate the bonding mechanism which is believed to involve free radical attack at both the silane functionality and the polymer molecules. Thus the energy of bonding is dependent upon the particular chlorinated organic material, the silane functionality and the polymeric resin. Heating to temperatures in the range of 500–550° F. is generally sufficient.

In an alternative embodiment of the invention, the siliceous material can be coated with only the above described silane (c) and the resin particles, powder or film can be coated with the chlorinated organic compound (d). When the silane-treated reinforcing material is bonded with the coated resins, such as by thermoforming or injection molding, the high strength composite of the invention is obtained.

In a modification of this embodiment, a blend of the resin particles or powder and a particulate inert carrier, which has been impregnated or coated with the chlorinated organic compound, is formed. This blend is then heated to the softening point of the polymer and bonded to the silane-treated siliceous material. Suitable inert carriers include talc, silicas and clays. This method is advantageous in that the molder can store the more volatile of the chlorinated compounds in sealed containers until ready to use. In the practice of this embodiment, the chlorinated compound carrier is mixed with resin particles as they are fed to the extruder or other thermoforming device. When the silane-treated reinforcing material is incorporated into the blend, the previously described reaction occurs and the superior bonding of the siliceous material to the resin is obtained.

The specific embodiments described above are advantageous when the end user obtains commercially available silane-treated reinforcing materials and then adds the chlorinated organic material to the resin during processing. The commercially available silane-treated glass contains sizing agents, such as polyvinylacetate or starch, and other materials such as lubricants. These materials only slightly reduce the high bond strengths obtained by the practice of the invention.

When the treated siliceous material of the invention is utilized to reinforce articles made from resins of polyethylene, polypropylene or copolymers thereof, the articles made from such resins exhibit superior strength and retain their strength at much higher temperatures than resins which are reinforced with untreated siliceous material. In some cases a strength increase of approximately 100% over resin reinforced with untreated glass is realized.

The following examples are illustrative of the invention, which is properly delineated in the appended claims.

EXAMPLE 1

Glass cloth (181-style E) was immersed in an aqueous solution containing 1.0 percent by weight of $$H_2N(CH_2)_2HN(CH_2)_3Si(OCH_3)_3$$

The cloth was air-dried for 1 hour and oven-dried at 230° F. for 7 minutes. Portions of the silane-treated glass cloth were then immersed in acetone solutions containing various concentrations of octachlorocyclopentene.

Polypropylene laminates were formed using untreated glass cloth, silane-coated glass cloth and the silaneoctachlorocyclopentene coated glass cloth. The laminates were formed in a chase mold with 2 plies of glass separating each sheet of polypropylene film. The film was 20 mils thick. The completed laminates consisted of 8 sheets of polypropylene and 14 plies of glass cloth, the glass cloth being laid in unidirectional nested manner. The lay-ups were placed in a hydraulic press and heated to about 300° F. while slowly applying pressure. The laminates were pressed for 20 minutes at 250 p.s.i. and 485° F., then cooled in the press. Three samples of each type of laminate were tested in flexure according to ASTM D790–63, both as molded and after being immersed in boiling water for 2 hours.

Laminate description and test results are tabulated below. The description of the glass treatment refers to a aqueous solution containing one weight percent of the described silane, followed by coating with a solution of acetone containing the noted weight percent of octachlorocyclopentene.

| Glass cloth treatment | Dry flex (p.s.i.) | Wet flex (p.s.i.) (after 2 hrs. in boiling water) |
|---|---|---|
| None | 14,300 | 10,600 |
| (1% silane only) | 15,900 | 12,400 |
| Silane plus 0.5% octachlorocyclopentene | 23,500 | 17,800 |
| Silane plus 1% octachlorocyclopentene | 36,200 | 31,800 |
| Silane plus 2% octachlorocyclopentene | 37,600 | 31,000 |
| Silane plus 3.5% octachlorocyclopentene | 34,500 | 31,400 |

As can be seen from the data, treatment of the glass with the n-(2-aminoethyl)-3-aminopropyl trimethoxysilane and octachlorocyclopentene results in laminates having greatly increased strength as compared to laminates made from the untreated glass. The necessity of including the chlorinated organic compound as a coating on the glass or in the resin is demonstrated by the comparison of strengths for laminates formed with glass having only the silane coating.

Equivalent results are obtained when the polypropylene film uned in the preparation of the laminates is coated with the acetone solution of octachlorocyclopentene and the glass cloth having only the silane coating is used for reinforcement. Thus, the octachlorocyclopentene can be present either as a coating on the glass or the resin.

EXAMPLE 2

Glass cloth (E-style 181) was treated with 1% aqueous solution of $H_2N(CH_2)_2NH(CH_2)_3Si(OCH_3)_3$ and 1% acetone solution of octachlorocyclopentene as was described in Example 1. Laminates were formed from the treated glass cloth and sheets of 20 mil-thick polyethylene film in the manner described in Example 1. For purposes of comparison, a laminate of untreated glass cloth and polyethylene film was also prepared. The polyethylene laminate of untreated glass had a dry flex strength of 13,600 p.s.i., while the laminate formed with the treated glass had a dry flex strength of 22,600 p.s.i. These results demonstrate the improved strengths obtained by the practice of the invention when polyethylene is bonded to the treated siliceous material.

EXAMPLE 3

Injection molded polypropylene composites were compared at 15, 25, 35 and 45 percent by weight glass fiber loadings. The comparisons were made using a commercially available glass fiber and glass fibers which had been treated with a 2-4 weight percent solution of n-(2-aminoethyl)-3-aminopropyl trimethoxysilane at the producer's bushing, chopped to approximate ¼ inch-length and then immersed in a 1.5 weight percent solution of octachlorocyclopentene. A commercially available injection molding grade of polypropylene resin was used.

The chopped fibers and polypropylene powder were blended and fed into a 1½ ounce reciprocating screw injection molding apparatus which was operated under the following conditions:

| | |
|---|---|
| Total cycle time _____ seconds__ | 45 |
| Injection time _____do____ | 5 |
| Cylinder temperature (both front and back) __° F__ | 500 |
| Mold temperature _____° F__ | 140 |
| Injection pressure _____p.s.i__ | 5000-7000 |
| Back pressure _____p.s.i__ | 500-750 |

The composites fabricated by this injection molding apparatus were tested for tensile strength according to the method of ASTM D638-64T and for flexural sterength according to the method of ASTM D790-63. Test results for the different composites are given below:

| | Composite | | | | | | | |
|---|---|---|---|---|---|---|---|---|
| | Tensile strength (p.s.i.) | | | | Flexural strength (p.s.i.) | | | |
| Weight percent glass. | 15 | 25 | 35 | 45 | 15 | 25 | 35 | 45 |
| Untreated glass | 6,200 | 6,600 | 6,800 | 5,900 | 10,800 | 12,000 | 13,200 | 12,400 |
| Treated glass | 7,400 | 9,700 | 11,800 | 12,600 | 12,800 | 17,500 | 22,800 | 24,500 |

These tests demonstrate that, at all levels of glass loadings, the composites of the invention exhibit significant strength increases over the composites fabricated with conventional glass fibers. It is important to note that the treated glass composite at a glass loading of only 15% was comparable in strengteh to the composite of conventional glass at optimum (35%) loading.

During testing the conventional composites, it was observed that as the stress was applied, stretch marks appeared along the test bar, indicating that the bond between the glass and the polypropylene matrix was failing and that the plastic was carrying most of the load. Upon failure of these composites, a large number of extending fibers were evident at the break point. When the composites prepared in accordance with the invention were stressed, stretch marks were not observed and there were only a minimum of fibers observed in the broken end of the test specimen. This indicates that the glass fibers were carrying the load and that the strengths obtained were near optimum.

EXAMPLE 4

Injection molded polypropylene composites were prepared to determine the effectiveness of a variety of silane coupling agents. The composites were prepared at 35 percent glass fiber loading utilizing the apparatus described in Example 3.

Glass roving was treated by dipping in toluene bath which contained 2 weight percent of chlorinated xylene, and various amounts of a silane coupling agent. The chlorinated xylene was

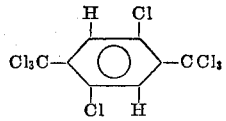

After the single bath treatment, the roving was dried at about 200° F. for one minute to remove the solvent and then chopped to ¼-inch length.

After molding the blend of fibers and polypropylene, the composites were tested to determine tensile and flex srengths. The concentration and composition of the particular silane, which was utilized in combination with the chlorinated xylene, is related to the composite sterength in the following table.

| Glass treatment | Tensile strength (p.s.i.) | Flexural strength (p.s.i.) |
|---|---|---|
| Toluene solution containing 2 weight percent chlorinated xylene plus— | | |
| 0.5 weight percent mercaptopropyltrimethoxysilane | 10,200 | 17,500 |
| 1.0 weight percent mercaptopropyltrimethoxysilane | 10,100 | 18,600 |
| 1.0 weight percent isobutyltrimethoxysilane | 8,400 | 14,600 |
| 0.8 weight percent vinyltrimethoxysilane | 8,500 | 14,700 |
| 1.0 weight percent phenyltrimethoxysilane | 9,200 | 16,900 |
| 1.2 weight percent γ-methyl-4 dimethylpentyltrichlorosilane | 8,400 | 11,600 |

The tensile strength of untreated glass of the type used above is about 5000 p.s.i. thus, it is apparent that the glass treated in accordance with the invention gives an improvement in strength of the composite.

To demonstrate scale-up ability, a blend of polypropylene and chopped glass fibers (30 weight percent) which had been treated with $$H_2N(CH_2)_2NH(CH_2)_3Si(OCH_3)_3$$

and chlorinated xylene was fed to a 12 ounce injection molder. The molded composites had a tensile strength of 11,800 p.s.i.

EXAMPLE 5

Glass cloth (181-style E) was immersed in an aqueous solution containing one weight percent $$H_2N(CH_2)NH(CH_3)_3Si(OCH_3)_3$$

and dried. The silane-treated glass cloth was then immersed in an acetone solution containing 1.5 weight percent octachloropropane and dried. Using the method described in Example 1, the treated glass cloth and polypropylene were laminated. The laminates had a dry flex strength of 29,300 p.s.i. and after two hours immersion in boiling water had a wet flex strength of 30,100 p.s.i. Glass cloth was treated and laminated with polypropylene by the same procedure as described above except that trichloromelamine was used as the chlorinated organic material. The laminates had a dry strength of 31,700 p.s.i. and after two hours immersion in boiling water had a wet flex strength of 29,100 p.s.i.

This data demonstrates the effectiveness of octachloropropane and trichloromelamine when utilized in the practice of the invention.

EXAMPLE 6

To demonstrate a preferred embodiment of the invention, inert carrier material was impregnated with various amounts of chlorinated organic material and the impregnated carrier was then added to a blend of 65 weight percent polypropylene powder and 35 weight percent treated chopped glass fiber. The glass had been treated with a 1.5 weight percent solution of $$H_2N(CH_2)_2NH(CH_2)_3Si(OCH_3)_3$$

previous to chopping. The blends were injected molded to form composites which were then tested to determine tensile and flex strength.

In a first series of composites, 20 weight percent octachlorocyclopentene was added to a commercially available talc and the mixture was ball milled for a time sufficient to ensure that the chlorinated material was adhered to the carrier. Various amounts of the treated carrier were added to the above described polypropylene-glass fiber blend. Strengths of the injection-mold composites formed therefrom are given below:

| Grams of treated carrier/ 100 grams of blend | Tensile strength (p.s.i.) | Flexural strength (p.s.i.) |
|---|---|---|
| 0.1 | 6,000 | 12,000 |
| 0.3 | 9,000 | 18,200 |
| 0.5 | 10,000 | 18,500 |
| 1.0 | 9,200 | 17,200 |
| 1.5 | 9,100 | 17,000 |
| 2.0 | 9,100 | 16,400 |

When compared to the 4,900 p.s.i. tensile and 10,000 p.s.i. flex strengths obtained from blend alone (no treated talc added), the effect of adding the chlorinated material is evident.

In a second series of runs, the procedure and materials were the same, except that only 10 weight percent octachlorocyclopentene was milled into the talc. Composite strengths are as follows:

| Grams of treated carrier/ 100 grams of blend | Tensile strength (p.s.i.) | Flexural strength (p.s.i.) |
|---|---|---|
| 1.0 | 9,200 | 17,500 |
| 2.0 | 9,200 | 17,300 |
| 3.0 | 8,600 | 16,600 |
| 4.0 | 7,800 | 15,500 |

In a third series of runs, talc was impregnated with 20 weight percent of the chlorinated xylene used in Example 4 and added in various amounts to the polypropylene-glass fiber blend prior to injection molding. Strengths of the molded composites are tabulated below:

| Grams of treated carrier/ 100 grams of blend | Tensile strength (p.s.i.) | Flexural strength (p.s.i.) |
|---|---|---|
| 0.5 | 7,600 | 14,800 |
| 1.5 | 8,900 | 17,100 |
| 3.0 | 8,700 | 17,400 |

In a forth series of runs, the same procedure was used, except that 20 weight percent chlorendic anhydride was milled with the talc. Strengths of the molded composites are given below:

| Grams of treated carrier/ 100 grams of blend | Tensile strength (p.s.i.) | Flexural strength (p.s.i.) |
|---|---|---|
| 1.4 | 7,900 | 14,800 |
| 5.0 | 8,700 | 17,800 |

EXAMPLE 7

Ground quartz, of an average particle size of 5 microns, was balled-milled with 10 weight percent of octachlorocyclopentene to form a treated carrier which was added to the polypropylene-glass fiber blend described in Example 6. Strengths of the injection molded composites are given below:

| Grams of treated carrier/ 100 grams of blend | Tensile strength (p.s.i.) | Flexural strength (p.s.i.) |
|---|---|---|
| 2.0 | 9,300 | 17,700 |
| 5.0 | 8,600 | 15,800 |

When compared to the 4,400 p.s.i. tensile and 9,400 p.s.i. flex strengths of composite to which 5 grams of untreated ground quartz per/100 grams of blend were added, this data shows that the quartz is not acting as a reinforcing agent but acts solely as a carrier for the chlorinated organic material.

EXAMPLE 8

When a glass panel is primed with a 1 weight percent aqueous solution of

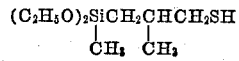

dried, coated with an acetone solution of octachlorocyclopentene, contacted with a film poly(ethylene-propylene) copolymer, and the composite is subjected to ultraviolet light and is heated, a very high strength bond is formed between the glass and the copolymer.

EXAMPLE 9

Injection molded polypropylene composites were prepared to determine the effectiveness of a variety of chlorinated paraffinic hydrocarbons. The composites were prepared at 35 percent glass fiber loading utilizing the apparatus and conditions described in Example 3. The glass fibers are commercially available, having been treated with a 2-4 weight percent solution of n-(2-aminoethyl)-3-aminopropyl trimethoxysilane at the producer's bushing. The fibers were chopped into approximate ¼-inch lengths. A commercially available injection molding grade polypropylene resin was used. The chlorinated paraffins were blended as liquids or powders with the polypropylene except the emulsified paraffins which applied to the glass fibers and allowed to dry before mixing with the resins.

After molding the blend of silane-treated fibers, chlorinated paraffin and polypropylene, the composites were tested to determine tensile and flex strength. The con- utilized in the blend and the corresponding composite strengths are given in the table below:

| Concentration and composition of chlorinated paraffin in composite | Composite strength | |
|---|---|---|
| | Tensile (p.s.i.) | Flexural (p.s.i.) |
| 1 weight percent $C_{20}H_{24}C_{16}$ (powder) | 18,400 | 10,000 |
| 3 weight percent $C_{20}H_{24}Cl_{18}$ (powder) | 15,400 | 8,400 |
| 1% emulsion [1] of $C_{20}H_{24}Cl_{18}$ | 14,750 | 8,400 |
| 1.5% emulsion [1] of $C_{20}H_{24}Cl_{18}$ | 13,400 | 9,500 |
| 3% emulsion [1] of $C_{20}H_{24}Cl_{18}$ | 13,200 | 9,400 |
| 5% emulsion [1] of $C_{20}H_{24}Cl_{18}$ | 13,800 | 9,800 |
| 1 weight percent $C_{22}H_{38}Cl_8$ | 10,100 | 5,440 |
| 1 weight percent $C_{11}H_{16}Cl_8$ | 19,100 | 10,360 |

[1] Coated onto glass fibers and dried prior to blending with polypropylene.

The tensile strength or comparable composites utilizing the silane-treated glass but no chlorinated organic compound is about 9000 p.s.i. Thus, the above data demonstrate the strength improvement obtained by the practice of the invention.

Reasonable modification and variation are within the scope of the invention, which sets forth novel high strength composite articles and methods for fabricating such articles.

That which is claimed is:

1. A method of improving the adhesion of (a) solid siliceous material to (b) polymers and copolymers of ethylene and propylene comprising the steps of:
   (1) applying to the surface of (a) a silane (c) of the general formula $X_aR_{3-a}SiR'$ and partial condensates thereof in which:
      X is the hydroxyl group or a hydrolyzable radical;
      R is a lower alkyl radical;
      R' is an organofunctional radical selected from the group consisting of amino radicals, mercapto radicals, aryl, alkaryl and aralkyl radicals of no more than 14 carbon atoms, monovalent linear aliphatic hydrocarbon radicals containing a tertiary hydrogen atom and having no more than 18 carbon atoms and monovalent hydrocarbon radicals contiing a vinyl linkage and having no more than 18 carbon atoms; and
      a has a value of 2 or 3;
   (2) applying to the surface of at least one of the silane treated (a) or (b), a chlorinated organic compound (d) selected from the group consisting of octachlorocyclopentene, chlorinated xylene perchlorinated xylene, perchloro-4,4-dimethyl-biphenyl, chlorendic acid, chlorendic anhydride, octachloropropane, hexachloroethane, trichloromelamine and chlorinated paraffinic hydrocarbons having from 10 to 30 carbon atoms and containing from 40 to 75 percent by weight chlorine.

(3) contacting (a) and (b) with the treated surface or surfaces between them; and (4) applying energy to the composite of (a), (c), (d) and (b) until a bond is formed between them which is superior in strength to the bond formed by (a) and (b) alone.

2. The method of claim 1 wherein the chlorinated organic compound (d) is applied to the silane-treated surface of the siliceous material (a).

3. The method of claim 1 wherein the chlorinated organic compound (d) is applied to the surface of the polymeric material (b).

4. The method of claim 1 wherein the polymeric material (b) is contacted with an inert particulate carrier which has coated on the surface thereof the chlorinated compound (d).

5. The method of claim 4 wherein the inert particulate carrier is talc.

6. The method of claim 4 wherein the inert particulate carrier is ground quartz.

7. The method of claim 1 wherein the amount of silane (c) coated onto (a) is in the range of 0.1 to 2.5 percent by weight of (a) and the amount of (d) coated onto either (a) or (b) is in the range of 0.2 to 5 percent by weight of (a).

8. The method of claim 1 wherein (b) is polypropylene.

9. The method of claim 1 wherein (c) is n-(2-amino-ethyl)-3-aminopropyltrimethoxysilane.

10. The method of claim 1 wherein (d) is octachlorocyclopentene.

11. The method of claim 1 wherein (d) is chlorendic anhydride.

12. The method of claim 1 wherein (d) is a chlorinated paraffinic hydrocarbon.

13. The method of claim 12 wherein (d) is a chlorinated paraffinic hydrocarbon of the formula $C_{11}H_{16}Cl_8$.

14. The method of claim 12 wherein (d) is a chlorinated paraffinic hydrocarbon of the formula $C_{22}H_{30}Cl_8$.

15. The method of claim 12 wherein (d) is a chlorinated paraffinic hydrocarbon of the formula $C_{11}H_{16}Cl_8$.

16. The method of claim 1 wherein the application of energy comprises heating the composite to a temperature above 500° F.

References Cited

UNITED STATES PATENTS

| Number | Date | Name | Class |
|---|---|---|---|
| 3,013,915 | 12/1961 | Morgan | 161—170 |
| 3,369,926 | 2/1968 | Eakins | 117—67 |
| 3,395,069 | 7/1968 | Pleuddemann | 161—193 |
| 3,425,895 | 2/1969 | Mertzweiller | 161—193 |
| 3,437,550 | 4/1969 | Paul | 161—193 |
| 3,451,886 | 6/1969 | Eakins | 161—93 |
| 3,472,729 | 10/1969 | Sterman et al. | 161—93 |
| 3,492,150 | 1/1970 | Zisman et al. | 117—75 |

CHARLES E. VAN HORN, Primary Examiner

M. B. WITTENBERG, Assistant Examiner

U.S. Cl. X.R.

156—314, 329, 331